United States Patent
Blaum et al.

(10) Patent No.: US 9,495,247 B2
(45) Date of Patent: Nov. 15, 2016

(54) TIME MULTIPLEXED REDUNDANT ARRAY OF INDEPENDENT TAPES

(71) Applicant: International Business Machines Corporation, Armonk, NY (US)

(72) Inventors: Mario Blaum, San Jose, CA (US); Veera W. Deenadhayalan, San Jose, CA (US); Steven R. Hetzler, Los Altos, CA (US); Wayne C. Hineman, San Jose, CA (US); Robert M. Rees, Los Gatos, CA (US); Pin Zhou, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 14/524,133

(22) Filed: Oct. 27, 2014

(65) Prior Publication Data

US 2016/0117222 A1 Apr. 28, 2016

(51) Int. Cl.
*G06F 11/10* (2006.01)
*G06F 3/06* (2006.01)
(Continued)

(52) U.S. Cl.
CPC ......... *G06F 11/1076* (2013.01); *G06F 3/0619* (2013.01); *G06F 3/0644* (2013.01);
(Continued)

(58) Field of Classification Search
CPC ............ G06F 11/1076; G06F 2211/1011; G06F 2211/1026; G06F 2211/103; G06F 2211/1092; G06F 11/1084; G06F 2211/108; G06F 2211/104; G06F 3/0659; G06F 3/0689; G06F
(Continued)

(56) References Cited

U.S. PATENT DOCUMENTS 3,798,614 A  3/1974 Meadows et al.
5,233,618 A  8/1993 Glider et al.
(Continued)

OTHER PUBLICATIONS

IBM TDB, "Counter-intuitive RAID Rebuild Algorithm for Virtual Tape Server", original publication date: Oct. 1, 2001, IP.com publication Jun. 20, 2003, IP.com No. IPCOM000015294D; 2 pages.
(Continued)

*Primary Examiner* — Phung M Chung
(74) *Attorney, Agent, or Firm* — Cantor Colburn LLP; Bryan Butler

(57) ABSTRACT

Embodiments relate to a computer system for storing data on a time multiplexed redundant array of independent tapes. An aspect includes a memory device that buffers data received by the computer system to be written to a set of tape data storage devices. The data is written to the set of tape data storage devices in blocks that form parity stripes across the set of tape data storage device. Aspects further includes a tape drive that writes data to one of the set of tape data storage devices at a time in a tape-sequential manner and a processor that computes a parity value for each of the parity stripes. The tape drive writes the parity values for each of the parity stripes to a last subset of tapes of the set of tape data storage devices.

20 Claims, 14 Drawing Sheets

(51) Int. Cl.
*G11B 20/12* (2006.01)
*G11B 20/10* (2006.01)
*G11B 20/18* (2006.01)

(52) U.S. Cl.
CPC ....... *G06F 3/0686* (2013.01); *G11B 20/10527* (2013.01); *G11B 20/1833* (2013.01)

(58) Field of Classification Search
CPC ................ 3/0619; G06F 3/0644; G06F 3/0686; G11B 20/1201
See application file for complete search history.

(56) References Cited

U.S. PATENT DOCUMENTS

| | | | | |
|---|---|---|---|---|
| 6,289,415 B1 * | 9/2001 | Johnson | .............. | G06F 11/1076 711/111 |
| 6,529,997 B1 * | 3/2003 | Debiez | ................. | G06F 3/0614 711/114 |
| 6,532,548 B1 * | 3/2003 | Hughes | ............... | G06F 11/1084 714/6.21 |
| 6,546,458 B2 * | 4/2003 | Milligan | ............. | G06F 11/1076 711/114 |
| 7,155,634 B1 | 12/2006 | Le Graverand et al. | | |
| 7,350,101 B1 * | 3/2008 | Nguyen | ............... | G06F 11/1084 711/114 |
| 7,809,880 B2 * | 10/2010 | Forbis, III | ............ | G06F 3/0613 711/111 |
| 2002/0087785 A1 * | 7/2002 | Milligan | ............. | G06F 11/1076 711/112 |
| 2006/0136778 A1 | 6/2006 | Graverand et al. | | |

OTHER PUBLICATIONS

List of IBM Patents or Patent Applications Treated as Related—Date Filed: Oct. 27, 2014; 2 pages.

\* cited by examiner

US 9,495,247 B2

TIME MULTIPLEXED REDUNDANT ARRAY OF INDEPENDENT TAPES

BACKGROUND

Embodiments of the invention relate generally to a redundant array of independent tapes, and more specifically, to systems and method for protecting stored data utilizing a time multiplexed redundant array of independent tapes.

In general, redundant array of independent disks (RAID) is a storage technology that combines multiple physical storage devices into a logical unit(s) for the purposes of data redundancy and performance improvement. In RAID systems, data is distributed across the physical storage devices in one of several ways, which are referred to as RAID levels, depending on the specific level of redundancy and performance required. In traditional RAID systems, all of the physical storage devices are accessible at the same time for write operations. Thus, a RAID stripe may be written essentially in parallel and any remapping that might occur, such as due to a newly detected defect, can be handled dynamically by remapping the block or stripe data with little impact on performance.

While some physical storage devices, such as hard disks and flash memory devices have somewhat variable capacity, the exact capacity of these devices is known prior to their use. For example, many of these types of devices are formatted at the factory and contain controllers that report capacity information to their host machine and the capacity information is available to a RAID controller before the RAID stripes are laid out. Accordingly, the RAID controller can ensure that all RAID stripes are written completely by selecting a stripe count such that the capacity required is no greater than the available capacity of the smallest disk.

In some physical storage devices, such as tapes, the capacities of the storage devices are not known prior to their use. For example, the tapes may have different physical lengths as well as different defects, which impact the capacity of the tape. Since data is written sequentially on a tape, the data capacity of a tape may not be known until the write operation to that tape is complete. In addition, write errors may be encountered during the write operation that results in a loss of capacity for the tape. In many cases, it is more cost effective to continue writing following a write defect than to take the time to attempt to re-write the location.

SUMMARY

Embodiments include a computer system for storing data on a time multiplexed redundant array of independent tapes. An aspect includes a memory device that buffers data received by the computer system to be written to a set of tape data storage devices. The data is written to the set of tape data storage devices in blocks that form parity stripes across the set of tape data storage device. Aspects further includes a tape drive that writes data to one of the set of tape data storage devices at a time in a tape-sequential manner and a processor that computes a parity value for each of the parity stripes. The tape drive writes the parity values for each of the parity stripes to a last subset of tapes of the set of tape data storage devices.

Embodiments further include a method and computer program product for storing data on a time multiplexed redundant array of independent tapes. The method includes receiving a series of data blocks to be written to a set of tape data storage devices in a tape-sequential manner, sequentially writing a first number of the series of data blocks to a first tape and setting a tape length variable to the first number. The method further includes sequentially writing a second number of the series of data blocks to a second tape and based on a determination that the second number is less that the tape length variable, setting the tape length variable to the second number and marking a subset of the first number of data blocks that exceeds the tape length variable as not written to the first tape. The method also includes sequentially writing a third number of the series of data blocks to a third tape, the third number of the series of data blocks including the subset of the first number of the series of data blocks, forming a number of parity stripes of blocks across the first tape, the second tape, and the third tape and calculating a parity data value for each of the parity stripes and sequentially writing the parity data values to a fourth tape.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to methods, systems and computer program products for a data protection on a time multiplexed redundant array of independent tapes (RAIT). In exemplary embodiments, a buffer receives and stores data to be written to a set of tapes having a non-uniform capacity. A tape drive writes data to one of the set of tapes at a time in a tape-sequential manner, wherein data is written to the set of tapes in blocks that form parity stripes across the set of tapes. A processor computes a parity value for each of the parity stripes and the tape drive writes the parity values for each of the parity stripes to a last of the set of tapes. As used herein, the nomenclature for RAIT levels will be the same as for RAID, e.g., RAIT 5 will refer to single parity arrangement, RAIT 6 to dual parity, etc., as it is in disk based storage systems.

Figure 1:
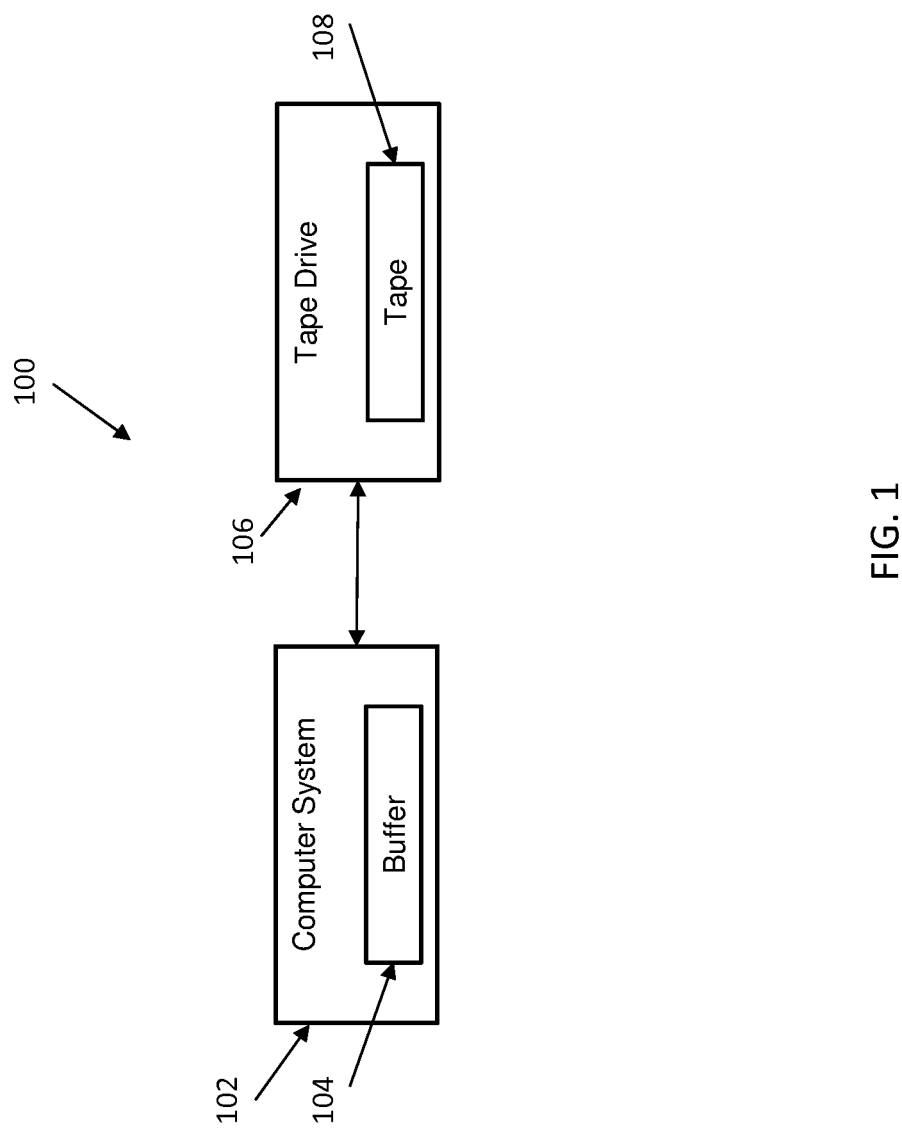
FIG. 1 depicts a block diagram of a data protection system for a time multiplexed redundant array of independent tapes in accordance with an embodiment.

Referring now to FIG. 1, a block diagram of a data protection system 100 for a time multiplexed redundant array of independent tapes in accordance with an embodiment is shown. In exemplary embodiments, the data protection system 100 includes a computer system 102 having a buffer 104 and a tape drive 106 configured to write data to a tape 108. Although illustrated separately, in various embodiments, the tape drive 106 may be part of the computer system 102. In exemplary embodiments, the tape drive 106 is configured to write to the tape 108 in large sequential blocks. The data protection system 100 only includes a single tape drive 106 that is used to write to a single tape at a time. Since only one tape 108 can be written to at a time, the computer system 102 utilizes the tape drive 106 to write RAIT stripes across multiple tapes 108 in a time multiplexed manner. In other words, the tapes 108 are written to sequentially.

In exemplary embodiments, the buffer 104 of the computer system 102 is configured to store data until the data is committed to the tape 108. In exemplary embodiments, the computer system 102 may use a RAID-type scheme to protect the data stored in the buffer 104. Since reading from and writing to a tape 108 is slower than hard disk or solid state disk, the buffer 104 may be implemented using hard disks or solid state disk devices.

In exemplary embodiments, data is written to the tape 108 in a log-structured manner, which includes performing long sequential writes on the tape 108. In exemplary embodiments, log structured writing significantly increases the speed of random writes. Data writes to tape 108 are configured to minimize tape disturbance effects, thus writes are at least one wrap in length and may be a band in length. In exemplary embodiments, a wrap is a minimum amount of tape 108 that is used for a single write operation and a band consists of a group of wraps. In one embodiment, a band may be the entire storage capacity of a tape 108. In exemplary embodiments, a wrap may be selected to be the size of a portion of a RAIT stripe that is stored on a tape 108.

In exemplary embodiments, the computer system 102 is configured to write to each of a plurality of tapes 108 sequentially, starting with a first tape having a first portion of a RAIT-stripe, and then progressing through the tapes to the last tape having a last portion of the RAIT stripe. In one embodiment, parity values may be written to the last tape in the sequence to ensure that the parity values are computed over all the data before being written. In another embodiment, the buffer 104 can be used to ensure that the parity values are correctly computed and the parity values can be written to any of the tapes 108 in the sequence. For example, the buffer 104 may be configured to accumulate an entire data stripe prior to writing the data strip to the tape 108, which allows any arrangement of data and parity values.

In exemplary embodiments, the data protection system 100 is configured to meet a certain reliability target, or RAIT level, for the data to be stored. The RAIT scheme only provides protection for data on a series of tapes 108 after the associated full parity stripe has been written to the series of tapes. In exemplary embodiments, the data can be protected to a similar degree when residing in the buffer 104 and when the parity stripe has only been partially written to the series of tapes by using a RAID scheme in the buffer 104. Since, the failure characteristics of the buffer 104 and the tape 108 are likely to be different, the RAID/RAIT level for each may be chosen independently.

In exemplary embodiments, the utilization of the buffer 104 can be improved by treating the data written to the tape 108 and stored in the buffer 104 as a single system. Each data block in the buffer 104 (data or parity value) that has been written to tape 108 can be marked as free once its parity has been computed and written either to the buffer or to the tape 108, and it has been written to the tape 108. By marking as free data that has been written to the tape 108, available space in the buffer 104 is increased while still maintaining the desired level of data protection. For example, if RAID 5 is used for the buffer and RAIT 5 on the tapes, data lost in the buffer due to a failure may be recovered by reading stripe data from the tape to complement the available buffer data.

In exemplary embodiments, the data may be retained in the buffer 104 after it is written to tape 108 as part of a read cache. In such a case, the RAID protection for the buffer 104 data may be relaxed, as the tape 108 holds a RAIT protected copy of all read cache data. For example, if the buffer data uses RAID 6 for dirty data (before writing to the tape), the RAID system for the buffer 104 may be relaxed to RAID 5 or no RAID protection once the write to the tape 108 is complete. In exemplary embodiments, the RAIT calculations are performed in a sequential manner, thus the data can be posted from the buffer 104 to the tape 108 before a full parity stripe has been accumulated. Accordingly, the data protection system 100 may operate in an efficient manner by writing data to the tape 108 prior to the accumulation of a full parity stripe's worth of data.

In exemplary embodiments, the size of the buffer 104 is determined in part by the behavior of the writes to the tape 108. For example, if the tape drive 106 is configured to write a band to the tape 108 without interruption, then the buffer 104 must be at least the size of the band. In other embodiments, the size of the buffer 104 may be the size of a full parity stripe or the size of a wrap of a tape 108. In another embodiment, the buffer 104 may only be large enough to accumulate a band's worth of data for one tape at a time and writing to subsequent tapes in the parity stripe may be delayed until such time as another band's worth of data is accumulated.

In one embodiment, the data protection system 100 includes four tapes 108 that each have a capacity of 500 GB and the tape drive 106 has a write data rate of 250 MB/s. In this system, a full band write of 125 GB of data would require about 500 seconds or about eight minutes to complete. Accordingly, if the data protection system 100 uses a 4+P RAIT 5, the completion of a parity stripe would require 2,500 seconds or about 45 minutes. Thus, the data protection system 100 will require a substantial buffer 104 when writing full bands. In exemplary embodiments, writing a smaller amount of data to each tape 108 would reduce the size requirements for the buffer 104.

Figure 2:
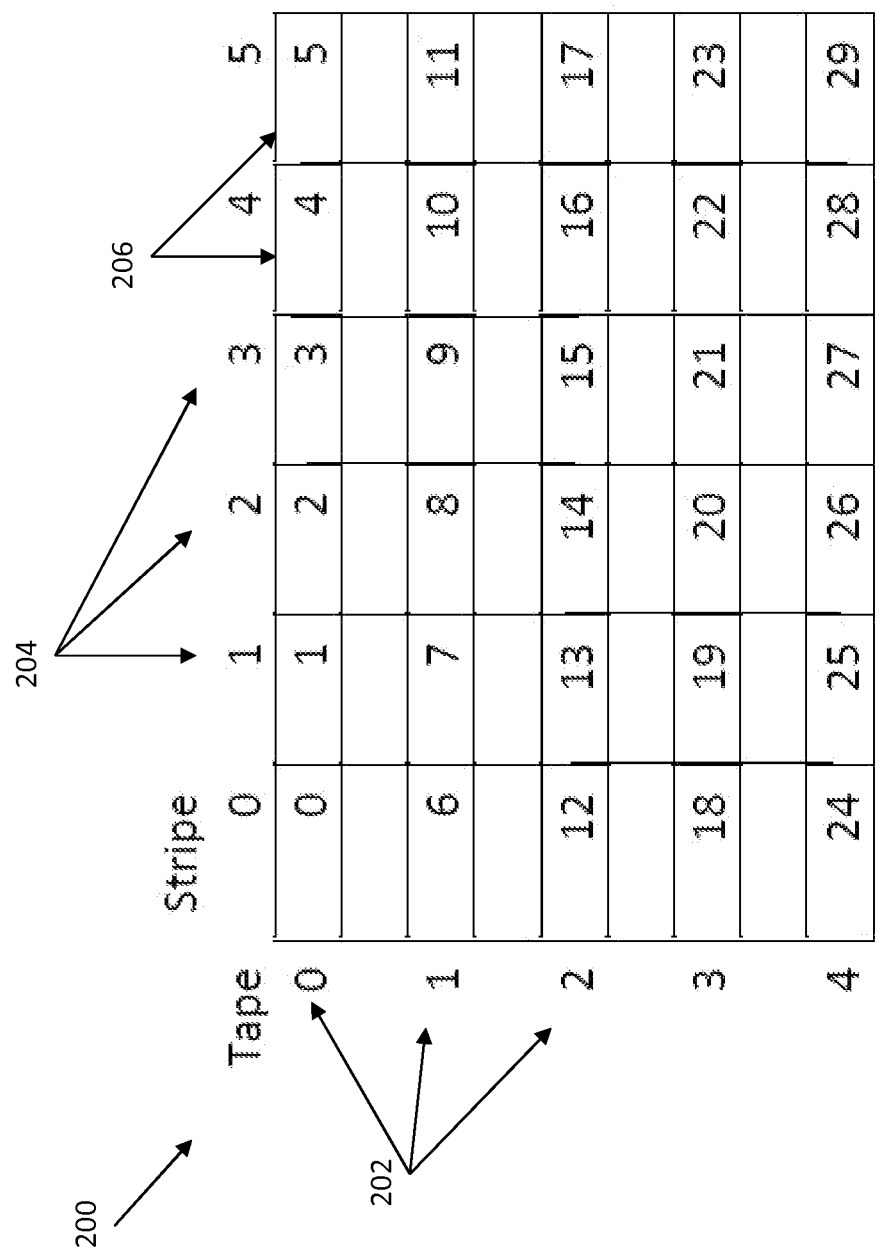
FIG. 2 depicts a block diagram of a time multiplexed redundant array of independent tapes in accordance with an embodiment.

Referring now to FIG. 2 a RAIT stripe configuration 200 for a set of five tapes 202 in a data protection system is shown. The data arrangement on the tapes 202 is shown as the rows, with each tape holding six data blocks 206. The RAIT stripes 204 are shown as the columns across the set of tapes 202. For example, stripe 0 comprises blocks (0, 6, 12, 18, 24). The block numbers indicate the order in which the blocks 206 are written on the tapes 202. In exemplary embodiments, tape 0 would be written first and then tapes 1 through 4 would be written sequentially. Accordingly, a RAIT stripe 204 is not considered to be committed to the tape 202 until such time as all the blocks 206 in the RAIT stripe 204 have been written to the tapes 202.

As described in more detail below, unlike hard disks and flash memory devices, tapes 108 can have significant variation in the capacity from one tape to the next, driven by variations in the length of the tape and defect lengths on the tape. Accordingly, the data capacity of each tape is not known in advance of writing to the tape. Thus, the data protection system is configured to account for this variance in capacity of the tapes.

Figure 3:
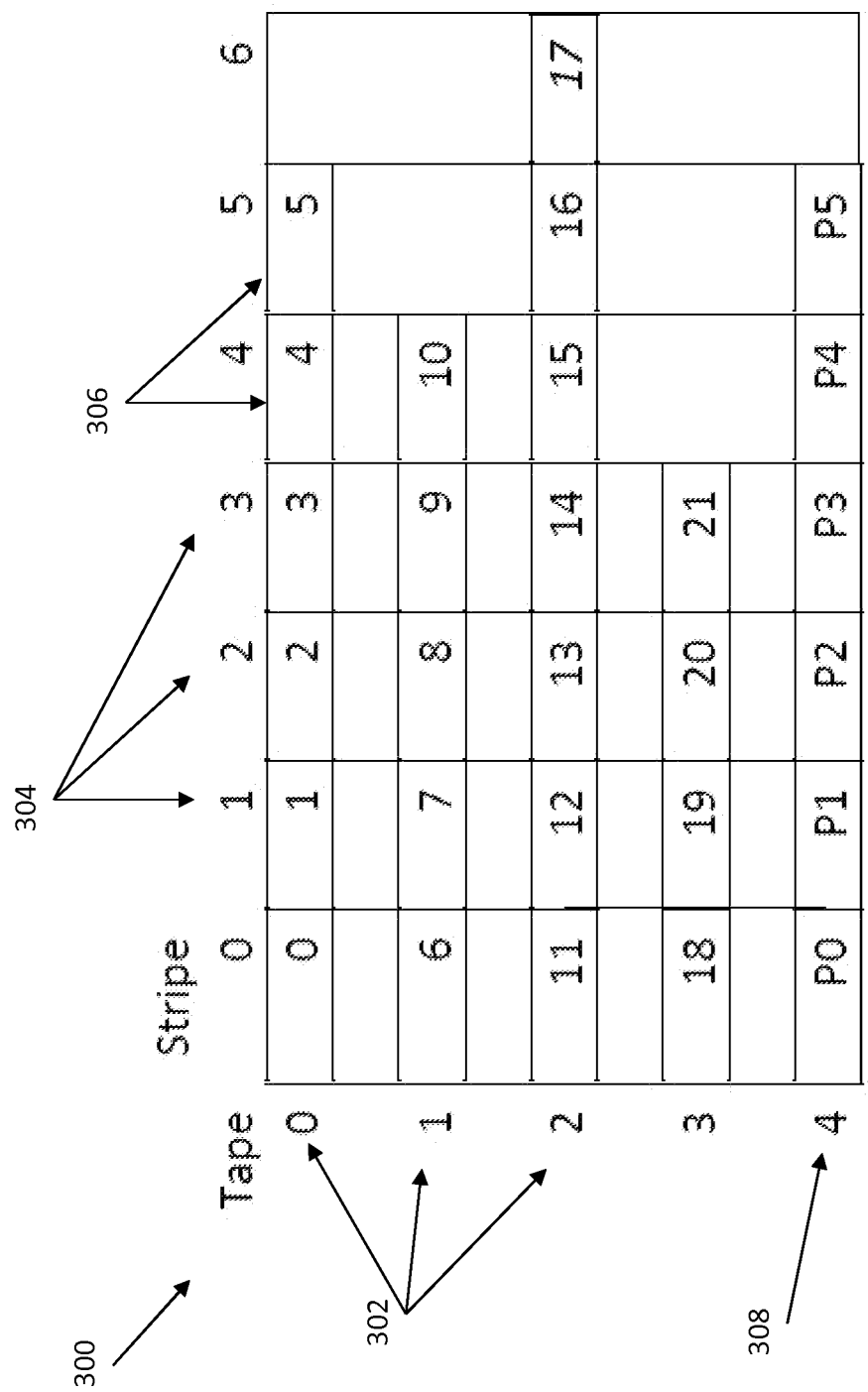
FIG. 3 depicts a block diagram of a time multiplexed redundant array of independent tapes in accordance with an embodiment.
Figure 4:
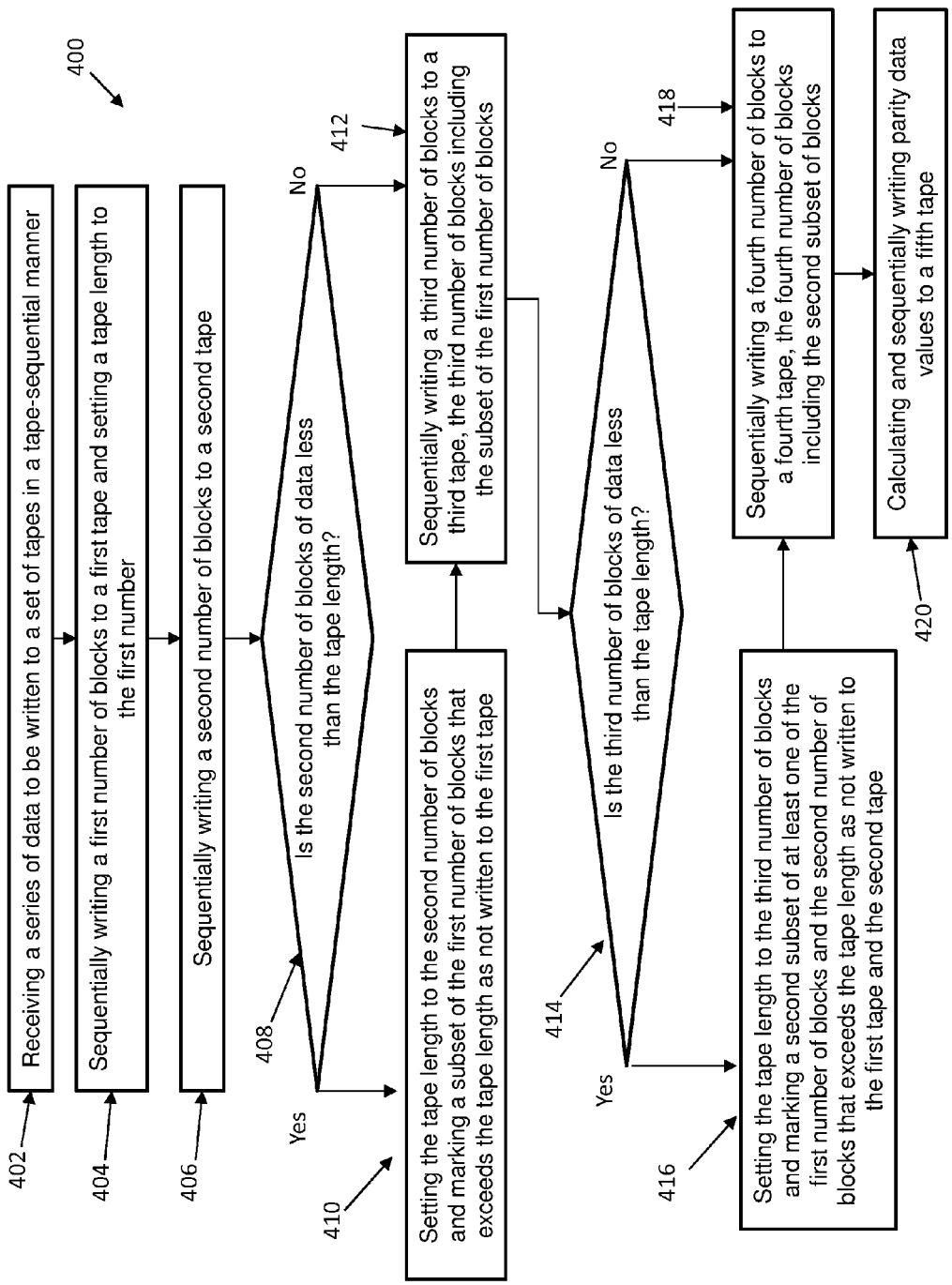
FIG. 4 depicts a process flow of a method for providing a data protection system on a time multiplexed redundant array of independent tapes in accordance with an embodiment.

Referring now to FIG. 3, a RAIT stripe configuration 300 for a set of five tapes 302 in a RAIT 5 data protection system is shown. As illustrated, the tapes 302 have a different number of blocks 306, which indicates that the capacities of the tapes 302 are not equal. The data arrangement on the tapes 302 is shown as the rows, the RAIT stripes 304 are shown as the columns across the set of tapes 302, and the parity data is written to the last tape 308. As illustrated, tape 0 has a length of six blocks and is written first, tape 1 has a length of only five blocks, tape 2 has a length of seven blocks, tape 3 has a length of four blocks, and tape 4 has a length of six blocks. RAIT stripes 0-3 all comprise five blocks 306, RAIT stripe 4 has only four blocks, RAIT stripe 5 has only three blocks and RAIT stripe 6 has only one block. As a result, block 17 has no protection at all, and the system fails to deliver the desired RAIT 5 data protection.

Since the parity data is written to the last tape 308, the parity data can only be pre-computed by assuming a uniform block count for all stripes 304 and a uniform number of blocks 306 in each tape 302. For example, if the system assumed there were six blocks in each tape 302, such as shown with FIG. 2, then the parity data could be pre-computed for RAIT stripe 0, blocks (0, 6, 12, 18) and stored in block 24. However, if the tapes 302 have a different number of blocks the parity data cannot be pre-computed and must be calculated after the data has been written to the first four tapes 302, which requires that the data from the first four tapes 302 be stored in the buffer until the parity data is computed and committed to the last tape 308. In addition, based on the assumption of six blocks in each tape, parity for RAIT stripe 5 was pre-computed to include blocks (5, 11, 17, 23), but since blocks 11 and 17 are written to the same tape 302, RAIT stripe 5 will not be able to actually provide RAIT-5 protection.

In exemplary embodiments, the data protection system is configured to use dynamic trimming when writing to the tapes. Dynamic trimming keeps the number of blocks of the RAIT stripes constant, but the set of blocks that make up each stripe is determined on the fly. In exemplary embodiments, dynamic trimming involves keeping track of a minimum tape length during the process of writing the stripes and scaling the data written to each of the set of tapes based on the minimum tape length.

Figure 5A:
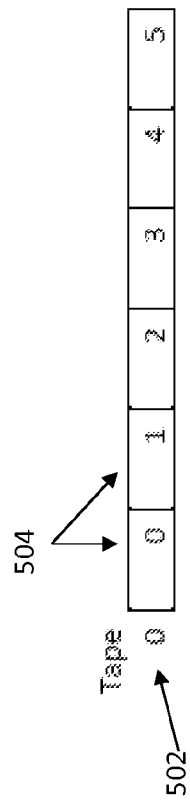
FIGS. 5A, 5B, 5C, 5D and 5E depict block diagrams illustrating the state of the tapes of a time multiplexed redundant array of independent tapes during the method of FIG. 4.
Figure 5B:
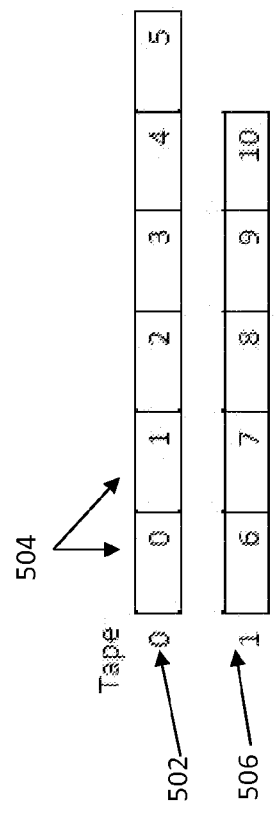

Referring now to FIG. 4 and FIGS. 5A through 5E, FIG. 4 presents a flowchart illustrating a method 400 for providing a data protection system in a time multiplexed redundant array of independent tapes and FIGS. 5A through 5E illustrate a RAIT stripe configuration during the steps of the method 400. As shown at block 402, the method 400 includes receiving a series of data to be written to a set of tapes in a tape-sequential manner. Next, as shown at block 404 and as illustrated in FIG. 5A, the method 400 includes sequentially writing a first number of blocks 504 to a first tape 502 and setting a tape length to the first number of blocks. In exemplary embodiments, the first number of blocks 504 is determined by a capacity of the first tape 502. Next, as shown at block 406 and illustrated in FIG. 5B, the method 400 includes sequentially writing a second number of blocks 504 to a second tape 506. In exemplary embodiments, the second number of blocks is based on a capacity of the second tape 506.

Figure 5C:
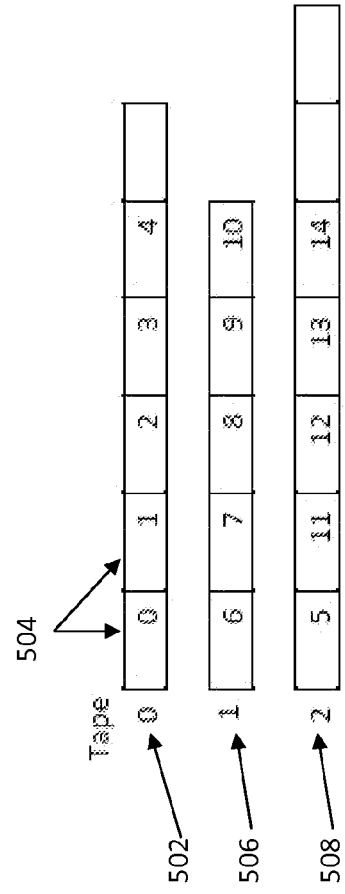

As illustrated at decision block 408, the method 400 includes determining if the second number of blocks of data is less than the tape length. If the second number of blocks of data is less than the tape length, the method 400 proceeds to block 410 and includes setting the tape length to the second number of blocks and marking a subset of the first number of blocks that exceeds the tape length as not written to the first tape. Next, as shown at block 412 and in FIG. 5C, the method 400 includes sequentially writing a third number of blocks to a third tape, the third number of blocks including the subset of the first number of blocks. For example, as shown in FIG. 5C, the number of blocks in the second tape 506 is less than the tape length, which is the number of blocks in the first tape 502. Accordingly, once the second tape 506 has been written to, block 5 is marked as not written to the first tape 502 and block 5 is then written to the third tape 508. If the second number of blocks of data is equal to or greater than the tape length, the method 400 proceeds directly to block 412 and sequentially writing a third number of blocks 504 to a third tape 508.

Figure 5D:
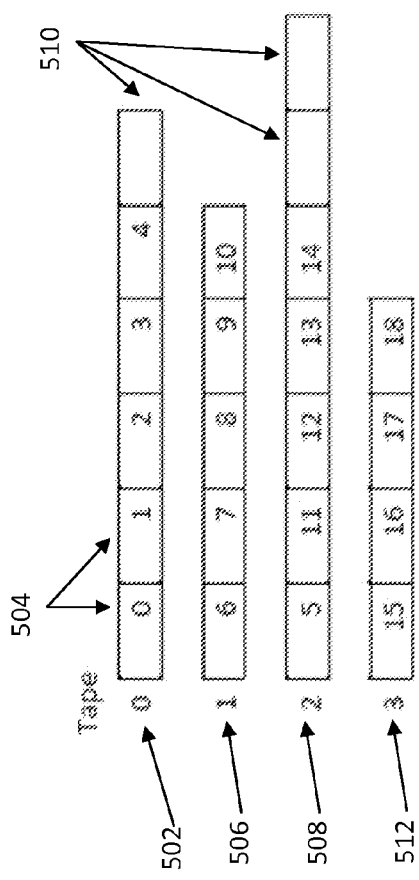
Figure 5E:
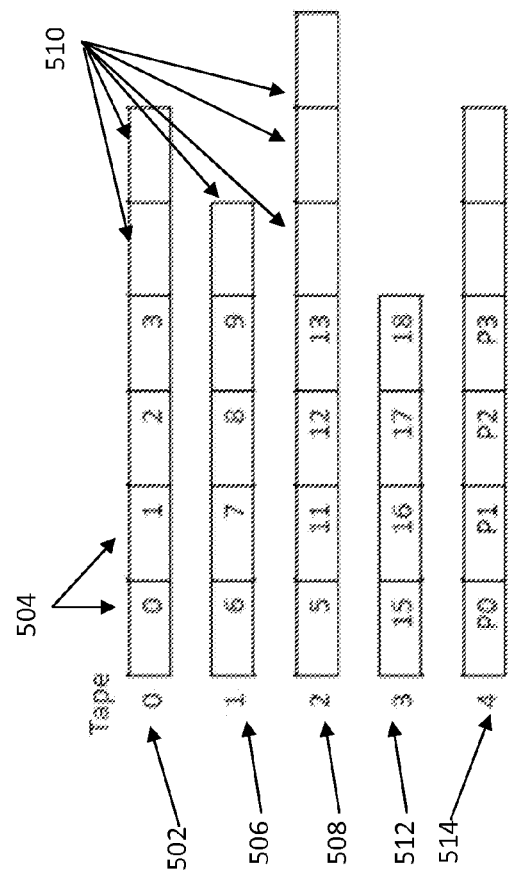

Next, as shown at decision block 414, the method 400 includes determining if the third number of blocks of data is less than the tape length. If the third number of blocks of data is less than the tape length, the method 400 proceeds to block 416 and includes setting the tape length to the third number of blocks and marking a subset of at least one of the first number of blocks and the second number of blocks that exceeds the tape length as not written to the first tape and the second tape. For example, as shown in FIG. 5D, the number of blocks in the fourth tape 512 is less than the number of blocks in the first tape 502, the second tape 506 and the third tape 508. Accordingly, once the fourth tape 512 has been written to, blocks 510 are marked as not written to the first tape 502, the second tape 506, and the third tape 508. If the third number of blocks of data is greater than or equal to the tape length, the method 400 proceeds directly to block 418 and sequentially writes a fourth number of blocks to a fourth tape. As shown at block 420 and in FIG. 5E, the method 400 concludes by calculating and sequentially writing the parity data values to a fifth tape 514.

In exemplary embodiments, once the lengths of a set of tapes are determined the length information can be retained for future use. However, the length information will not be invariant, since skips can occur during the write process, due to dynamic effects, grown defects, etc. In a log structured scheme, the garbage collection process will result in stripe sets being marked as free prior to their being used for subsequent writes. Thus, there will often be a pool of available stripes. In exemplary embodiments, tapes of similar lengths may be grouped together to form RAIT stripes to maximize the space utilization on the tapes.

In one embodiment, a predetermined minimum length for the set of tapes can be used in a RAIT stripe set when writing to the set of tapes, which will minimize the amount of data that needs to be moved. In one embodiment, the longest tape(s) in the set of tapes may be selected to be the last tape, which is used for storing the parity data, which also minimizes the amount of data that needs to be moved. However, since the actual length is determined at write time, such optimizations may not work in all cases, thus the method described above is still useful to manage the variation in tape capacities.

Figure 6A:
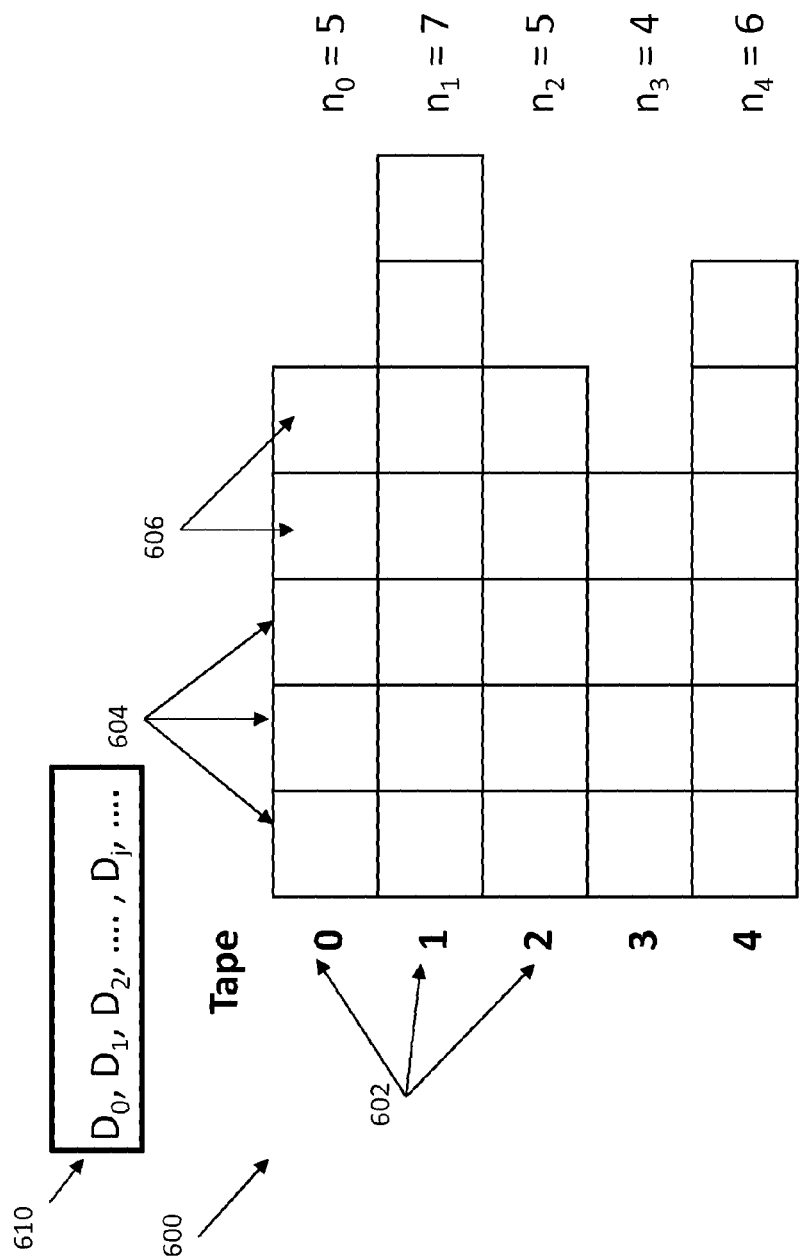
FIGS. 6A, 6B, 6C, 6D, 6E and 6F depict block diagrams illustrating the state of the tapes of a time multiplexed redundant array of independent tapes during the method of FIG. 7.
Figure 6B:
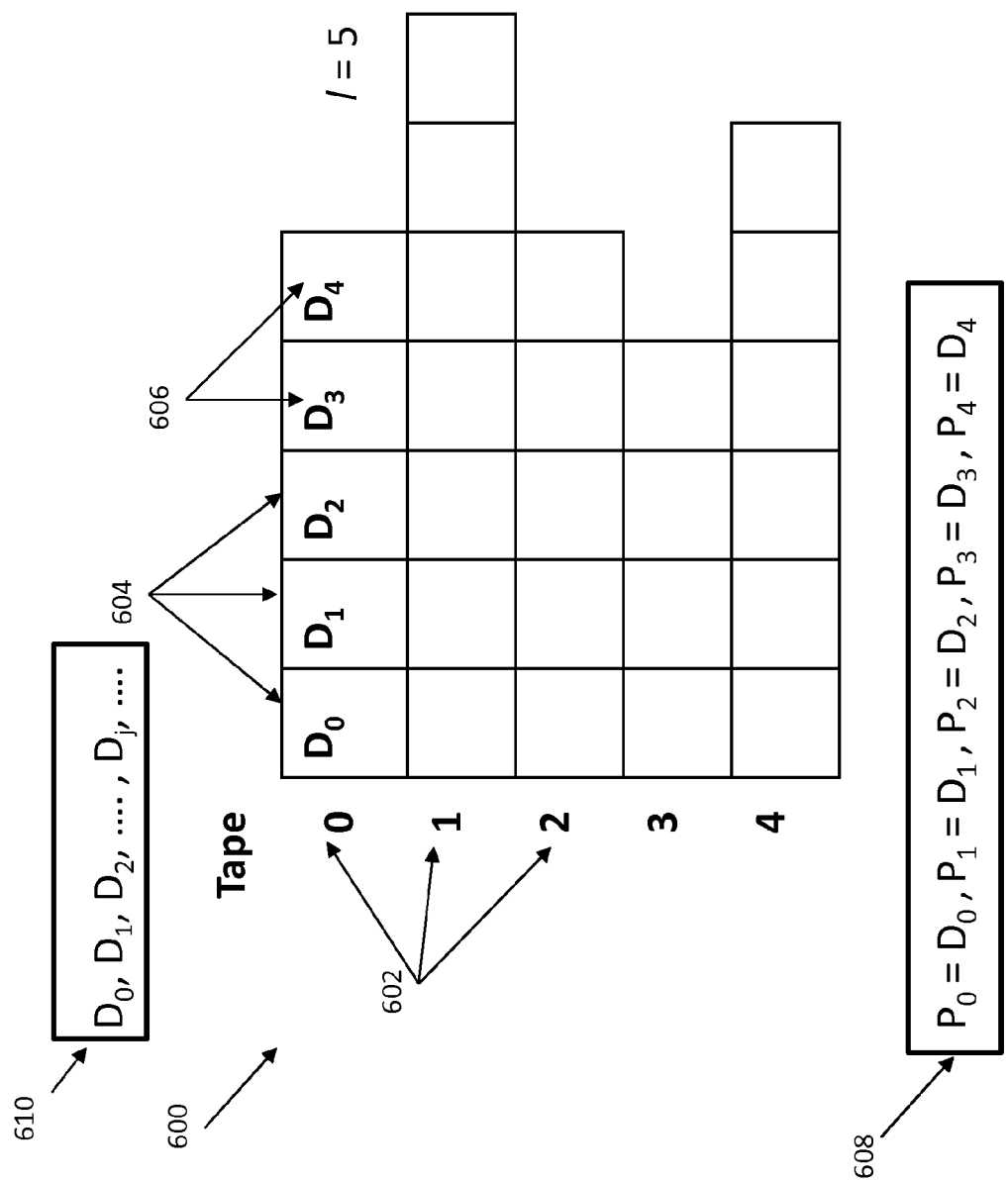

Referring now to FIG. 7 and FIGS. 6A through 6F, FIG. 7 illustrates a flowchart illustrating a method 700 for providing a data protection system in a time multiplexed redundant array of independent tapes and FIGS. 6A through 6F illustrate a RAIT stripe configuration 600 during the steps of the method 700. Specifically, assume that blocks of data 610, $D_0, D_1, D_2, \ldots$, are to be written into m−1 tapes 602 and there is an mth tape containing parity. The m tapes 602 can store $n_0, n_1$, blocks 606 respectively, but these numbers are not known a priori. As shown in FIG. 6B, the first step is writing blocks $D_0, D_1, D_2, \ldots D_{n0-1}$ into tape 0. Parity $P_0$, $P_1, P_2, \ldots P_{n0-1}$ is defined as $P_0=D_0, P_1=D_1, P_2=D_2, \ldots P_{n0-1}=D_{n0-1}$, stored in a buffer 608, and a minimum length $l=n_0$ is established. The sequence to be written next is $D_{n0}$, $D_{n0+1}, D_{n0+2}, \ldots$.

Assuming that tapes 602 0, 1, ... j−1 have been written, with j≤m−2, let the sequence of blocks of data to be written be $D_i, D_{i+1}, D_{i+2}, \ldots$. If $l \leq n_j$, then write $D_i, D_{i+1}, D_{i+2}, \ldots D_{i+l-1}$ into tape j, make $P_0=P_0 \oplus D_i$, $P_1=P_1 \oplus D_{i+1}$, $P_2=P_2 \oplus D_{i+2} \ldots P_{l-1}=P_{l-1} \oplus D_{i+l-1}$, where $\oplus$ denotes the XOR operation and let the sequence to be written next be $D_{i+l}, D_{i+l+1}, D_{i+l+2} \ldots$. If, on the other hand, $l>n_j$, then write $D_i, D_{i+1}, D_{i+2}, \ldots D_{i+nj-1}$ into disk j, make $P_0=P_0 \oplus D_i$, $P_1=P_1 \oplus D_{i+1}, P_2=P_2 \oplus D_{i+2}, \ldots P_{nj-1}=P_{nj-1} \oplus D_{i+l-1}$, and for each tape 0, 1, ... j−1, declare the data written after block $n_j-1$ as unwritten; let $D'_0, D'_1, D'_2, \ldots, D'_t$ be such data, and declare the sequence to be written next as $D'_0, D'_1, D'_2, \ldots D'_t, D_{i+nj}, D_{i+nj+1}, D_{i+nj+2} \ldots$. Redefine l as $l=n_j$.

Assume that parity tape m−1 is accessed and the sequence of blocks of data to be written in the next group of data tapes is $D_i, D_{i+1}, D_{i+2}, \ldots$. If $l \leq n_{m-1}$, then write the parity blocks $P_0, P_1, \ldots, P_{l-1}$ in the parity tape, keep the sequence of data to be written in the next group of data tapes as is and exit. If $l>n_{m-1}$, then write the parity blocks $P_0, P_1, \ldots, P_{nm-1}$, in the parity tape, and for each data tape 0, 1, ... m−2, declare the data written after block $n_{m-1}-1$ as unwritten; let $D'_0, D'_1, D'_2, \ldots, D'_t$ be such data, declare the sequence to be written in the next group of tapes as $D'_0, D'_1, D'_2, \ldots D'_t, D_{i+nj}, D_{i+nj+1}, D_{i+nj+2} \ldots$ and exit.

Figure 6C:
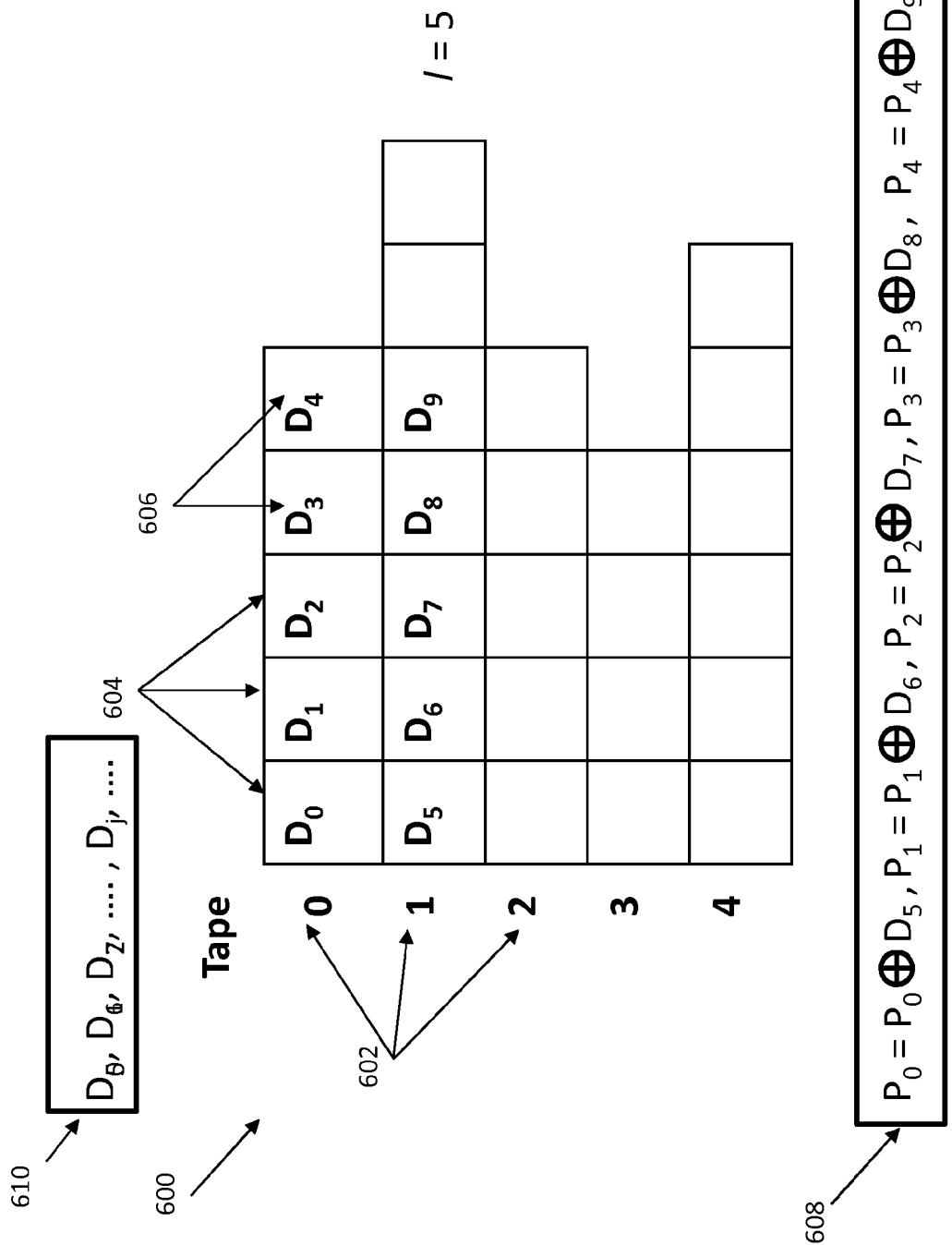
Figure 6D:
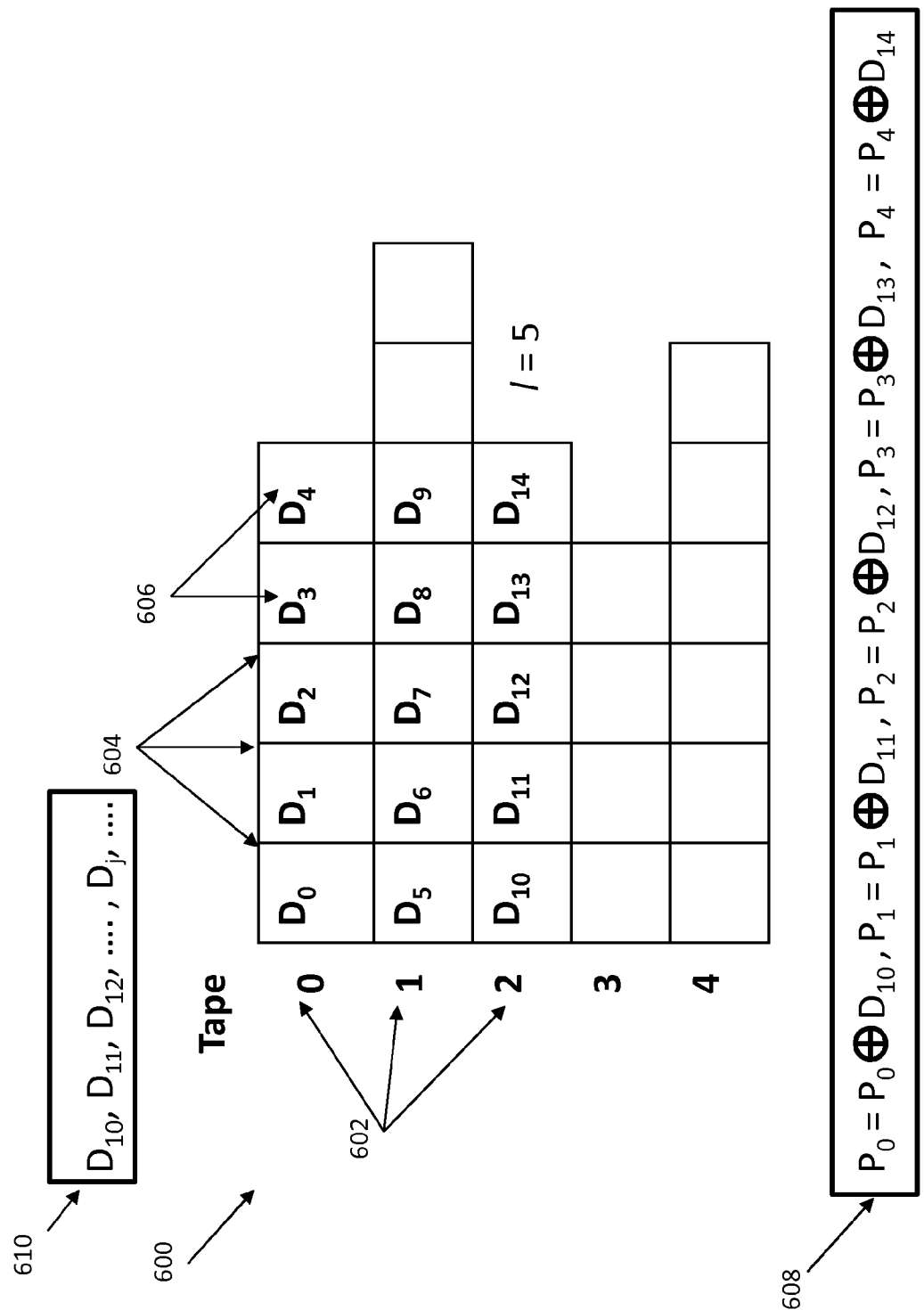
Figure 6E:
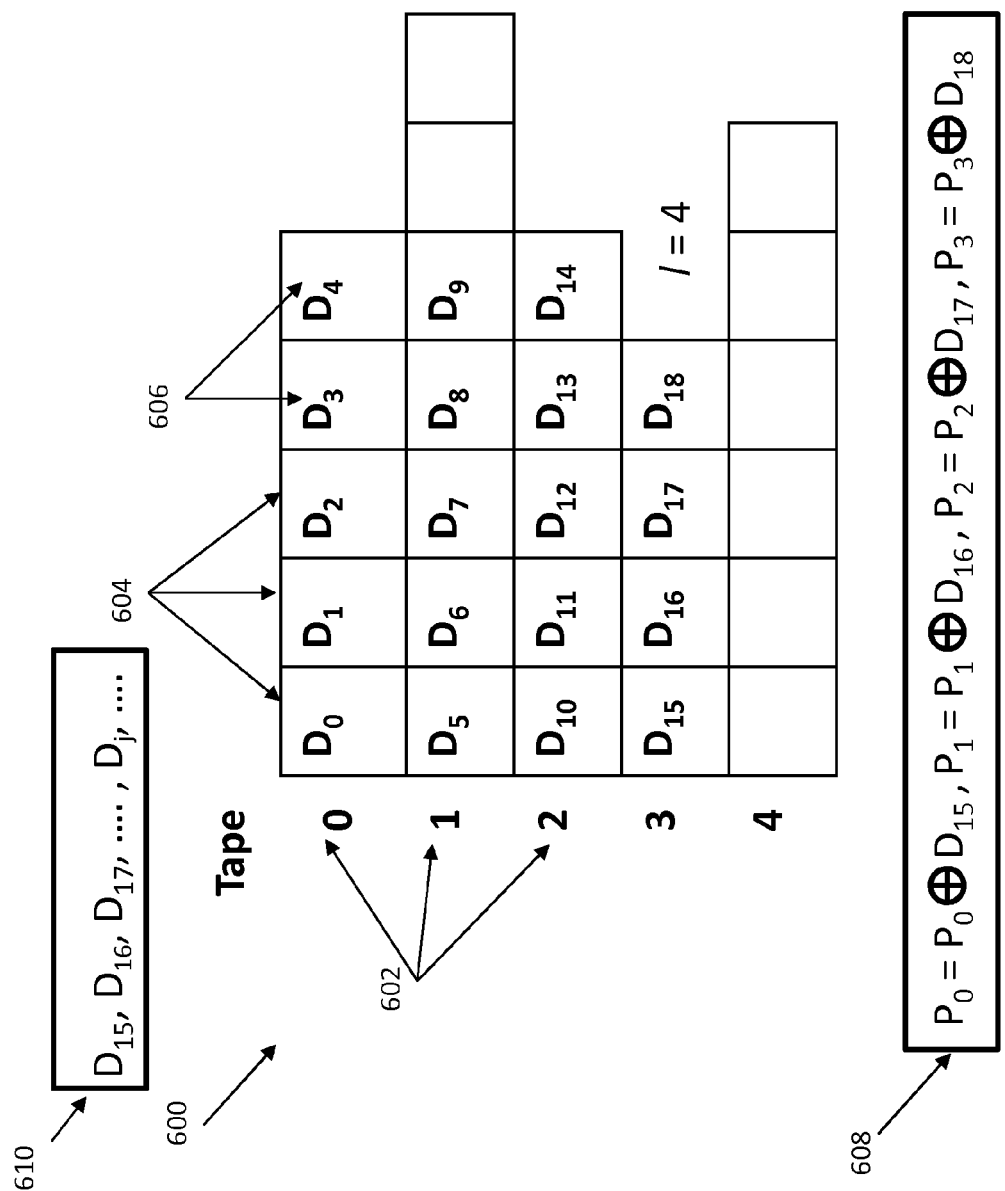
Figure 6F:
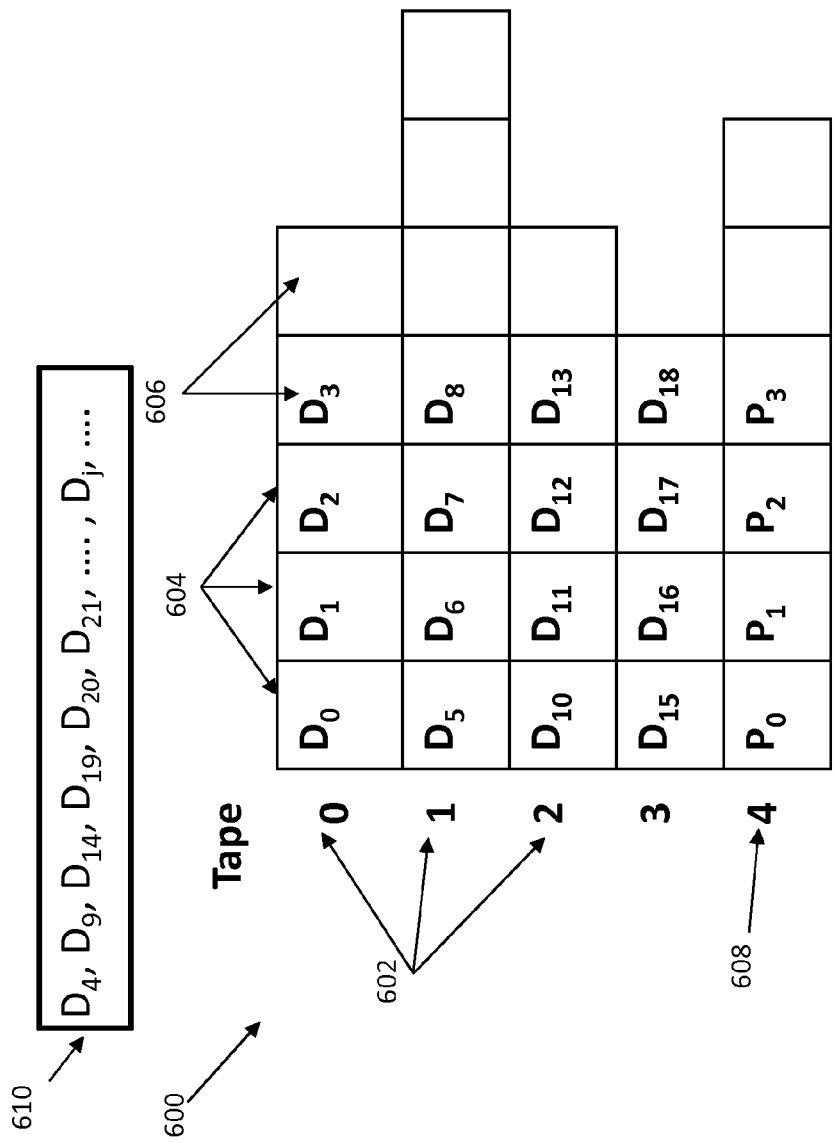

As shown in FIGS. 6A-6E there are 5 tapes of lengths 5, 7, 5, 4 and 6 respectively. In FIG. 6B, data $D_0, D_1, D_2, D_3$ and $D_4$ is written in tape 0, l is established as 5 and the parities $P_i$ stored in buffer 608. In FIG. 6C, data $D_5, D_6, D_7, D_8$ and $D_9$ is written in tape 1, l is maintained as 5 and the parities $P_i$ are recomputed by XORing the $P_i$s with the $D_i$s. In FIG. 6D, data $D_{10}, D_{11}, D_{12}, D_{13}$ and $D_{14}$ is written in tape 2, again l is maintained as 5 and the parities $P_i$ are recomputed by XORing the $P_i$s with the $D_i$s. In FIG. 6E, data $D_{15}$, $D_{16}, D_{17}$ and $D_{18}$ is written in tape 3, l is defined as 4 and the parities $P_i$ are recomputed by XORing the $P_i$s with the $D_i$s. The data in tapes 0, 1 and 2 that have been written after block 3 in each of these tapes, i.e., $D_4, D_9$ and $D_{14}$, are declared as unwritten, and will precede data $D_{19}, D_{20}, D_{21}, \ldots$, to be written in the next group of tapes, as shown in FIG. 6F. Parities $P_0, P_1, P_2$ and $P_3$ are written in tape 4.

Figure 7:
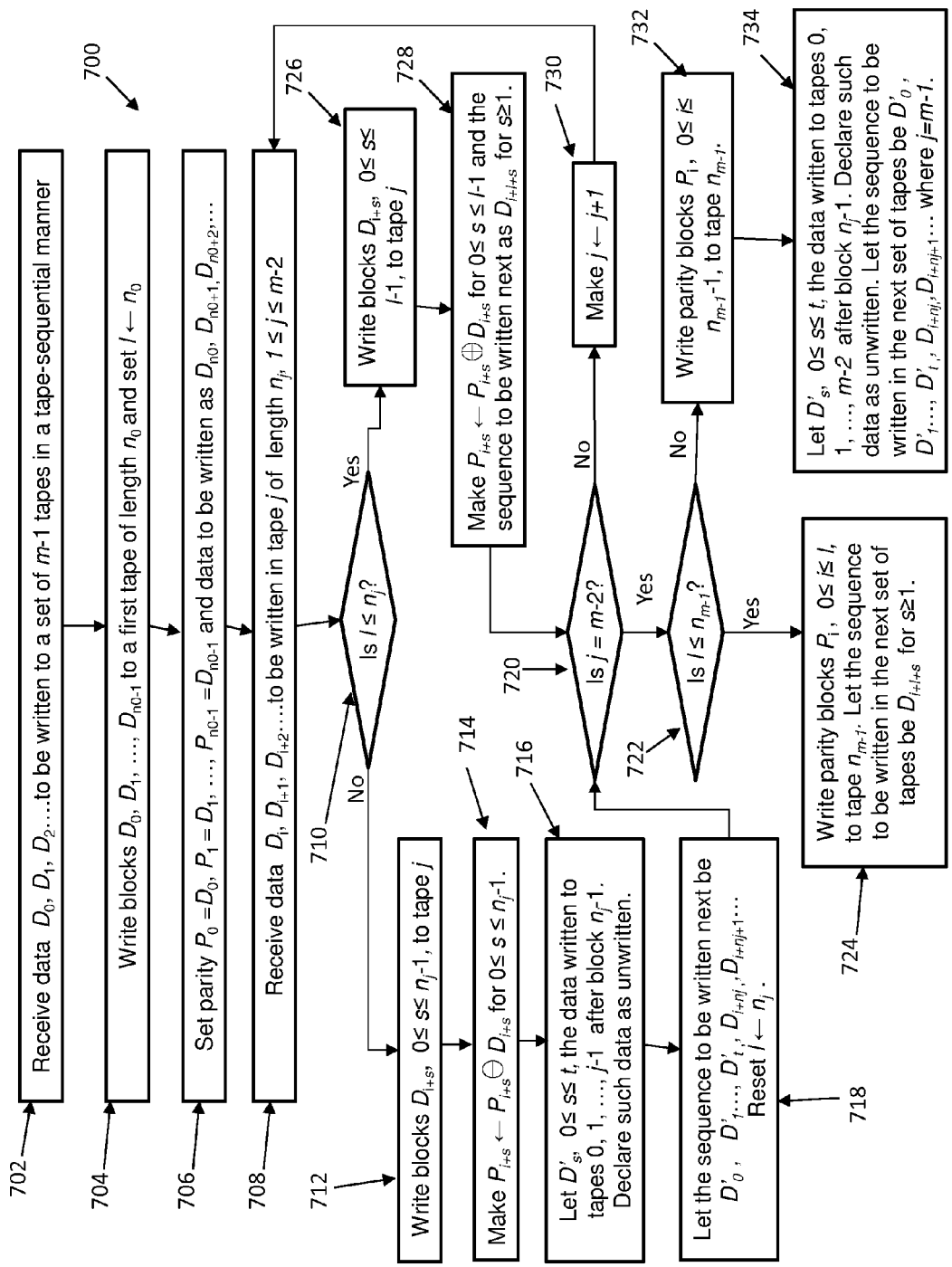
FIG. 7 depicts a process flow of a method for providing a data protection system on a time multiplexed redundant array of independent tapes in accordance with an embodiment.

Referring now to FIG. 7, as shown at block 702, the method 700 includes receiving data $D_0, D_1, D_2 \ldots$ to be written to a set of m−1 tapes in a tape-sequential manner. Next, as shown at block 704, the method 700 also includes writing blocks $D_0, D_1, \ldots, D_{n0-1}$ to a first tape of length $n_0$ and set $l \leftarrow n_0$. As shown at block 706, the method 700 includes setting parity $P_0=D_0, P_1=D_1, \ldots, P_{n0-1}=D_{n0-1}$ and data to be written as $D_{n0}, D_{n0+1}, D_{n0+2}, \ldots$. Next, as shown at block 708, the method 700 also includes receiving data $D_i$, $D_{i+i}, D_{i+2} \ldots$ to be written in tape j of length $n_j$, $1 \leq j \leq m-2$. As shown at block decision block 710, the method 700 includes determining if $l \leq n_j$. If $l \leq n_j$, then the method 700 proceeds to block 726. Otherwise the method 700 proceeds to block 712.

Continuing with reference to FIG. 7, as shown at block 712, the method 700 includes writing blocks $D_{i+s}, 0 \leq s \leq n_j-1$, to tape j. Next, as shown at block 714, the method 700 also includes making $P_{i+s} \leftarrow P_{i+s} \oplus D_{i+s}$ for $0 \leq s \leq n_j-1$. As shown at block 716, the method 700 includes letting $D'_s$, $0 \leq s \leq t$, the data written to tapes 0, 1, ... , j−1 after block $n_j-1$ and declaring such data as unwritten. Next, as shown at block 718, the method 700 also includes letting the sequence to be written next be $D'_0, D'_1, \ldots, D'_t, D_{i+nj}, D_{i+nj+1}$. As shown at block decision block 720, the method 700 includes determining if j=m−2. If j=m−2 then the method 700 proceeds to decision block 722. Otherwise the method 700 proceeds to block 730. As shown at block decision block 722, the method 700 includes determining if $l \leq n_{m-1}$. If $l \leq n_{m-1}$ the method 700 then the method 700 proceeds to decision block 724. Otherwise the method 700 proceeds to block 732.

Continuing with reference to FIG. 7, as shown at block 726, the method 700 includes writing blocks $D_{i+s}$, $0 \leq s \leq l-1$, to tape j. Next, as shown at block 728, the method 700 also includes making $P_{i+s} \leftarrow P_{i+s} D_{i+s}$ for $0 \leq s \leq l-1$ and the sequence to be written next as $D_{i+l+s}$ for $s \geq 1$. As shown at block 730, the method 700 includes making $j \leftarrow j+1$. As shown at block 732, the method 700 includes writing parity blocks $P_i, 0 \leq i \leq n_{m-1}-1$, to tape $n_{m-1}$. Next, as shown at block 734, the method 700 also includes letting $D'_s$, $0 \leq s \leq t$, the data written to tapes 0, 1, ..., m−2 after block $n_j-1$ and declaring such data as unwritten. The sequence to be written in the next set of tapes is declared to be $D'_0, D'_1, \ldots, D'_t, D_{i+nj}, D_{i+nj+1} \ldots$ where j=m−1. As shown at block 724, the method 700 includes writing parity blocks $P_i, 0 \leq i \leq l$, to tape $n_{m-1}$ and letting the sequence to be written in the next set of tapes be $D_{i+l+s}$ for $s \geq 1$.

Although the description given above involves one parity tape, it can be easily extended by those versed in the art to multiple parities as well. Specifically, each time data is accessed to be written in a new tape, multiple parities are computed using the new data and the corresponding old parity stored in the buffer. Alternate methods to compute the parities exists in the prior art, say, by accessing all the data written to the tapes, which doesn't require maintaining the old parities in the buffer. When the parity tapes are accessed, then parities are written such that they do not exceed the parameter l as defined above. When the parameter l exceeds the capacity of the parity tape being considered, then l is redefined as the length of the parity tape and in the data tapes, all the data written after the lth data block is considered unwritten and is stored to be written in the next set of data tapes.

Figure 8:
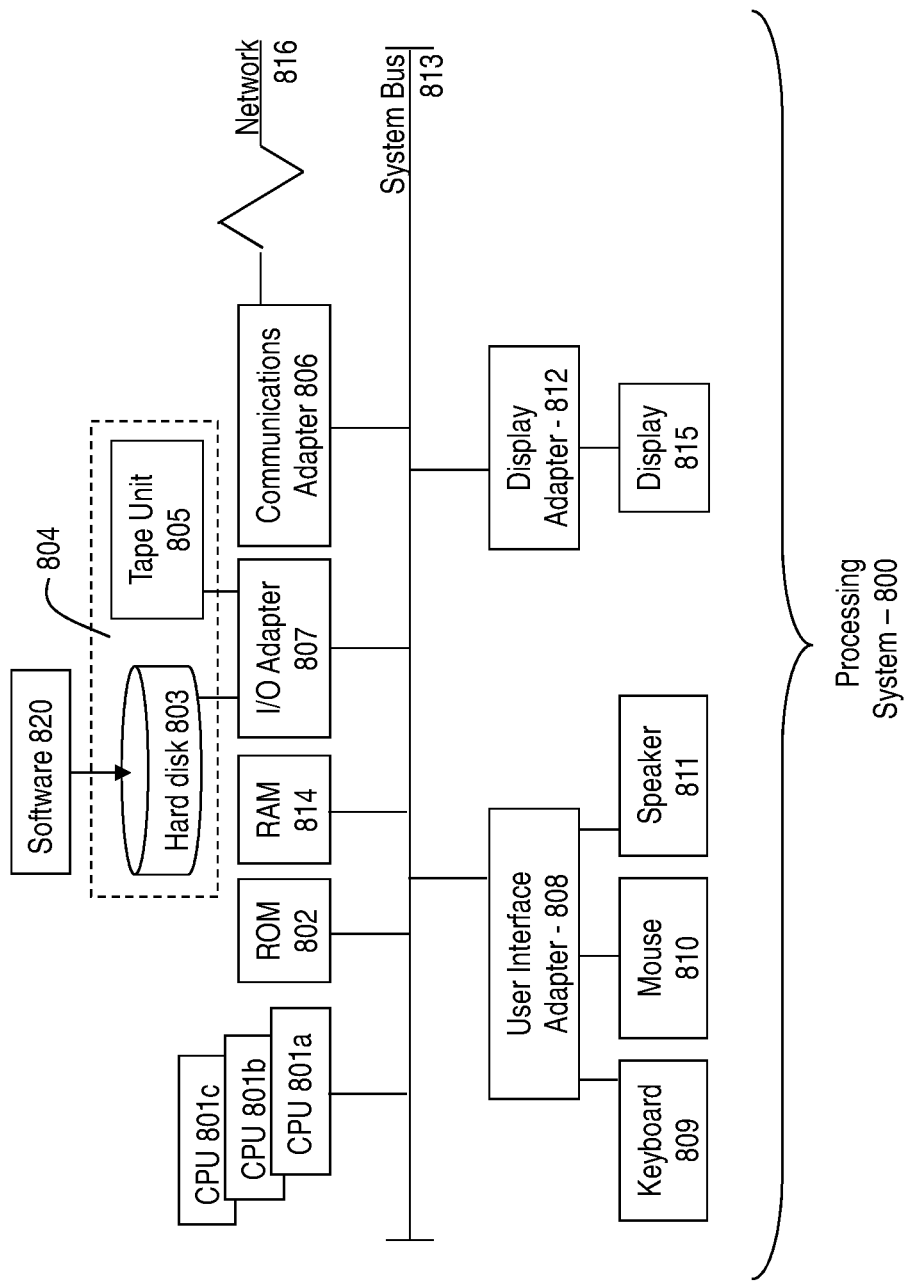
FIG. 8 depicts a processing system for practicing the teachings herein in accordance with an embodiment.

Referring to FIG. 8, there is shown an embodiment of a processing system 800 for implementing the teachings herein. In this embodiment, the system 800 has one or more central processing units (processors) 801a, 801b, 801c, etc. (collectively or generically referred to as processor(s) 801). In one embodiment, each processor 801 may include a reduced instruction set computer (RISC) microprocessor. Processors 801 are coupled to system memory 814 and various other components via a system bus 813. Read only memory (ROM) 802 is coupled to the system bus 813 and may include a basic input/output system (BIOS), which controls certain basic functions of system 800.

FIG. 8 further depicts an input/output (I/O) adapter 807 and a network adapter 806 coupled to the system bus 813. I/O adapter 807 may be a small computer system interface (SCSI) adapter that communicates with a hard disk 803 and/or tape storage drive 805 or any other similar component. I/O adapter 807, hard disk 803, and tape storage device 805 are collectively referred to herein as mass storage 804. Software 820 for execution on the processing system 800 may be stored in mass storage 804. A network adapter 806 interconnects bus 813 with an outside network 816 enabling data processing system 800 to communicate with other such systems. A screen (e.g., a display monitor) 815 is connected to system bus 813 by display adaptor 812, which may include a graphics adapter to improve the performance of graphics intensive applications and a video controller. In one embodiment, adapters 807, 806, and 812 may be connected to one or more I/O busses that are connected to system bus 813 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 813 via user interface adapter 808 and display adapter 812. A keyboard 809, mouse 180, and speaker 811 all interconnected to bus 813 via user interface adapter 808, which may include, for example, a Super I/O chip integrating multiple device adapters into a single integrated circuit.

Thus, as configured in FIG. 8, the system 800 includes processing capability in the form of processors 801, storage capability including system memory 814 and mass storage 804, input means such as keyboard 809 and mouse 180, and output capability including speaker 811 and display 815. In one embodiment, a portion of system memory 814 and mass storage 804 collectively store an operating system such as the AIX® operating system from IBM Corporation to coordinate the functions of the various components shown in FIG. 8.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for storing data on a time multiplexed redundant array of independent tapes, the computer system comprising:
    a memory device that buffers data received by the computer system and to be written to a set of tape data storage devices;
    a tape drive that writes data to each of the set of tape data storage devices at a time in a tape-sequential manner, wherein data is written to the set of tape data storage devices in blocks that form parity stripes across the set of tape data storage devices; and
    a processor in communication with the memory device and the tape drive that computes a parity value for each of the parity stripes and that tracks a tape length variable that is determined by a smallest number of data blocks written to one of the set of tape data storage devices,
    wherein the tape drive writes the parity values for each of the parity stripes to a last subset of tapes of the set of tape data storage devices.

2. The computer system of claim 1, wherein a capacity of at least two of the set of tape data storage devices is unequal, and wherein the capacity of each of the set of tape data storage devices is determined during writing to the tape.

3. The computer system of claim 1, wherein the data stored in the buffer is protected using a first set of computed parity values prior to the data being written to the set of tape data storage devices, and is protected by a second set of check parity after the data is written to a tape.

4. The computer system of claim 1, wherein data is written from the buffer to one of the set of tape data storage devices prior to accumulation of a full stripe of data in the buffer.

5. The computer system of claim 4, wherein data in the buffer is transferred to a read cache once the data has been written to one of the set of tape data storage devices.

6. The computer system of claim 4, wherein a full stripe of data is equal to a minimum capacity of one of the set of tape data storage devices.

7. The computer system of claim 1, wherein data is written from the buffer to one of the set of tape data storage devices upon the buffer accumulating a block worth of data.

8. The computer system of claim 1, wherein the processor stores a tape length variable, which indicates a minimum length the set of tape data storage devices.

9. A method for storing data on a time multiplexed redundant array of independent tapes, the method comprising
    receiving a series of data blocks to be written to a set of tape data storage devices by a tape drive in a tape-sequential manner;
    sequentially writing, by the tape drive, a first number of the series of data blocks to a first tape;
    setting a tape length variable to the first number;
    sequentially writing, by the tape drive, a second number of the series of data blocks to a second tape;
    based on a determination that the second number is less than the tape length variable, setting the tape length variable to the second number and marking a subset of the first number of data blocks that exceeds the tape length variable as not written to the first tape;
    sequentially writing, by the tape drive, a third number of the series of data blocks to a third tape, the third number of the series of data blocks including the subset of the first number of the series of data blocks;
    forming a number of parity stripes of blocks across the first tape, the second tape, and the third tape and calculating a parity data value for each of the parity stripes; and
    sequentially writing, by the tape drive, the parity data values to a fourth tape,
    wherein the tape drive writes data to each of the first tape, the second tape, the third tape and the fourth tape at a time in a tape-sequential manner.

10. The method of claim 9, wherein the first number of the series of data blocks is based on a capacity of the first tape, and wherein the capacity of the first tape is determined during writing to the first tape.

11. The method of claim 10, wherein the second number of the series of data blocks is based on a capacity of the second tape, and wherein the capacity of the second tape is determined during writing to the second tape.

12. The method of claim 9, wherein the data to be written to the set of tape data storage devices is stored in a buffer before being written to one of the first tape, the second tape and the third tape.

13. The method of claim 12, wherein the data stored in the buffer is protected using a first set of computed parity values prior to the data being written to one of first tape, the second tape and the third tape, and the data is protected by a second set of check parity after the data is written to one of first tape, the second tape and the third tape.

14. The method of claim 9, wherein the third number of the series of data blocks sequentially written to the third tape is not greater than the tape length variable.

15. A computer program product for storing data on a time multiplexed redundant array of independent tapes, the computer program product comprising a non-transitory computer readable storage medium having program code embodied therewith, the program code executable by a processor to:
receive a series of data blocks to be written to a set of tape data storage devices by a tape drive in a tape-sequential manner;
sequentially write, by the tape drive, a first number of the series of data blocks to a first tape;
set a tape length variable to the first number;
sequentially write, by the tape drive, a second number of the series of data blocks to a second tape;
based on a determination that the second number is less than the tape length variable, set the tape length variable to the second number and mark a subset of the first number of data blocks that exceeds the tape length variable as not written to the first tape;
sequentially write, by the tape drive, a third number of the series of data blocks to a third tape, the third number of the series of data blocks including the subset of the first number of the series of data blocks;
form a number of parity stripes of blocks across the first tape, the second tape, and the third tape and calculating a parity data value for each of the parity stripes; and
sequentially write, by the tape drive, the parity data values to a fourth tape,
wherein the tape drive writes data to each of the first tape, the second tape, the third tape and the fourth tape at a time in a tape-sequential manner.

16. The computer program product of claim 15, wherein the first number of the series of data blocks is based on a capacity of the first tape, and wherein the capacity of the first tape is determined during writing to the first tape.

17. The computer program product of claim 16, wherein the second number of the series of data blocks is based on a capacity of the second tape, and wherein the capacity of the second tape is determined during writing to the second tape.

18. The computer program product of claim 15, wherein the data to be written to the set of tape data storage devices is stored in a buffer before being written to one of the first tape, the second tape and the third tape.

19. The computer program product of claim 18, wherein the data stored in the buffer is protected using a first set of computed parity values prior to the data being written to one of first tape, the second tape and the third tape, and the data is protected by a second set of check parity after the data is written to one of first tape, the second tape and the third tape.

20. The computer program product of claim 15, wherein the third number of the series of data blocks sequentially written to the third tape is not greater than the tape length variable.

* * * * *